US 11,456,655 B2

(12) United States Patent
De Benedictis et al.

(10) Patent No.: US 11,456,655 B2
(45) Date of Patent: Sep. 27, 2022

(54) LINEAR MOTOR WITH STACKED ELECTROMAGNETS

(71) Applicant: KOMP-ACT SA, Renens (CH)

(72) Inventors: Salvatore De Benedictis, Onex (CH); Marcel Jufer, Morges (CH); Ross Fleming, Versoix (CH)

(73) Assignee: KOMP-ACT SA, Ecublens (CH)

( * ) Notice: Subject to any disclaimer, the term of this patent is extended or adjusted under 35 U.S.C. 154(b) by 110 days.

(21) Appl. No.: 16/968,111

(22) PCT Filed: Feb. 8, 2019

(86) PCT No.: PCT/EP2019/053201
§ 371 (c)(1),
(2) Date: Aug. 6, 2020

(87) PCT Pub. No.: WO2019/155022
PCT Pub. Date: Aug. 15, 2019

(65) Prior Publication Data
US 2021/0376708 A1 Dec. 2, 2021

(30) Foreign Application Priority Data
Feb. 9, 2018 (EP) .................................. 18156184

(51) Int. Cl.
*H02K 41/03* (2006.01)
(52) U.S. Cl.
CPC .................................. *H02K 41/031* (2013.01)
(58) Field of Classification Search
CPC ...... H02K 41/031; H02K 41/03; H02K 7/106; H02K 33/16
(Continued)

(56) References Cited

U.S. PATENT DOCUMENTS

| 5,691,582 | A |   | 11/1997 | Lucas |
| 6,040,642 | A | * | 3/2000  | Ishiyama ............. H02K 41/031 310/12.24 |

(Continued)

FOREIGN PATENT DOCUMENTS

| EP | 1 404 012 A2 | 3/2004 |
| EP | 2 224 581 A2 | 9/2010 |

(Continued)

OTHER PUBLICATIONS

Machine translation of WO-2015161859-A1. (Year: 2015).*

(Continued)

*Primary Examiner* — Michael Andrews
(74) *Attorney, Agent, or Firm* — SoCal IP Law Group LLP; Angelo Gaz

(57) ABSTRACT

Embodiments described include a electrical linear motor comprising a stator and an actuation shaft movable in a linear axial direction with respect to the stator. The stator comprising a casing, an electromagnet array mounted in the casing. The electromagnet array comprising a central orifice extending in the linear axial direction within which the actuation shaft extends. The actuation shaft comprising a permanent magnet arrangement comprising a plurality of magnetic pole segments. The electromagnetic array comprising a plurality of electromagnets to generate a magnetic field that in conjunction with the magnetic field of the permanent magnet arrangement generates an electromotive force between the stator and actuation shaft having a component in the axial direction to drive the actuation shaft relative to the stator.

18 Claims, 13 Drawing Sheets

(58) Field of Classification Search
USPC .......................................................... 310/14
See application file for complete search history.

(56) References Cited

U.S. PATENT DOCUMENTS

| | | | |
|---|---|---|---|
| 6,329,728 B1* | 12/2001 | Kitazawa | H02K 41/03 |
| | | | 310/14 |
| 6,603,224 B1 | 8/2003 | Hollingsworth et al. | |
| 7,291,953 B1* | 11/2007 | Smith | H02K 41/03 |
| | | | 310/191 |
| 2006/0108878 A1* | 5/2006 | Lindberg | H02K 1/02 |
| | | | 310/12.25 |
| 2008/0185982 A1* | 8/2008 | Iwasa | H02K 41/03 |
| | | | 318/135 |
| 2012/0098356 A1 | 4/2012 | Takeuchi | |
| 2015/0022030 A1 | 1/2015 | Rohner et al. | |
| 2016/0108878 A1 | 4/2016 | Falaschi et al. | |
| 2017/0229945 A1* | 8/2017 | Harnsberger | H02K 1/34 |

FOREIGN PATENT DOCUMENTS

| | | |
|---|---|---|
| EP | 2 337 195 A2 | 6/2011 |
| EP | 2 541 744 | 1/2013 |
| EP | 2 840 672 A1 | 2/2015 |
| EP | 3 270 495 A2 | 1/2018 |
| JP | 2004 053003 A | 2/2004 |
| JP | 2004 357464 A | 12/2004 |
| JP | 2008 253009 A | 10/2008 |
| JP | 2013 172481 A | 9/2013 |
| WO | 2004/075382 A2 | 9/2004 |
| WO | 2008/143492 | 11/2008 |
| WO | 2015/161859 A1 | 10/2015 |
| WO | WO-2015161859 A1 * | 10/2015 ............. H02K 33/16 |
| WO | 2019/155022 A1 | 8/2019 |

OTHER PUBLICATIONS

Kim et al., 1996, "Conference record of the IEEE industry applications conference annual meeting", Annual meeting 31. Oct. 6, 1996, pp. 471-478.

EPO/ISA, International Search Report and Written Opinion for PCT Application No. PCT/EP2019/053201 dated Jul. 8, 2019. 22 pages.

European Patent Office, Extended European Search Report for Application No. EP 18156184.6, dated Jun. 11, 2018. 11 pages.

* cited by examiner

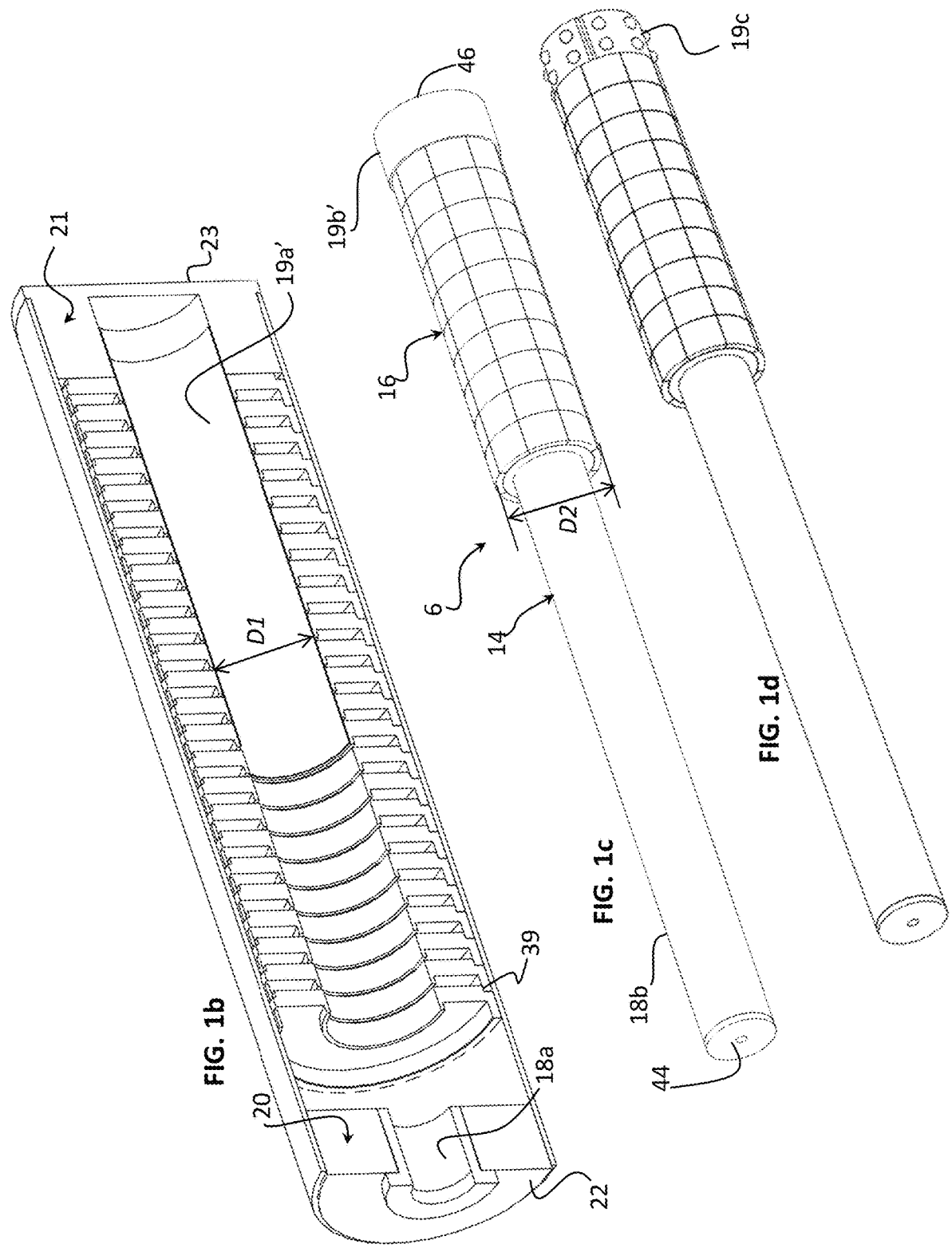

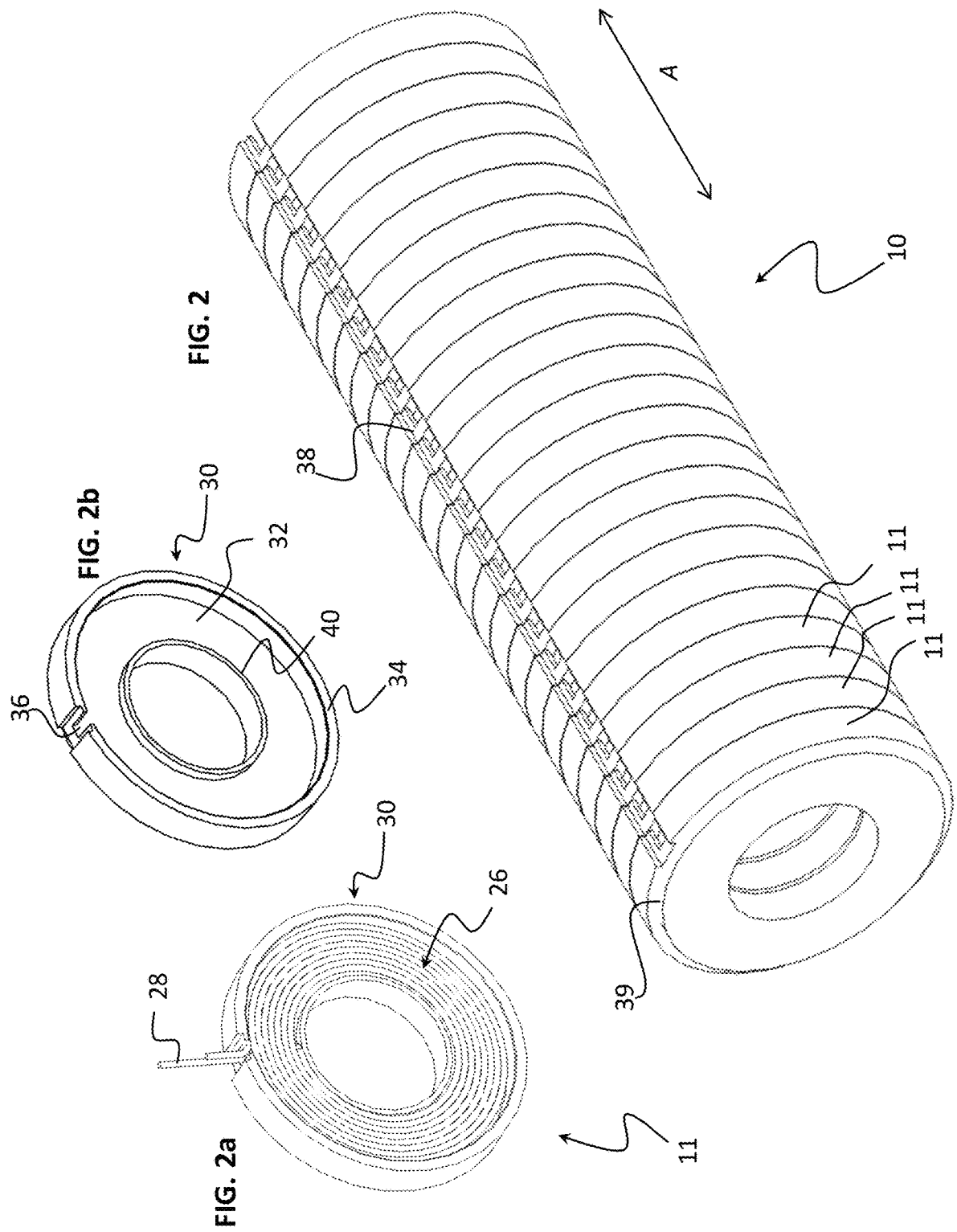

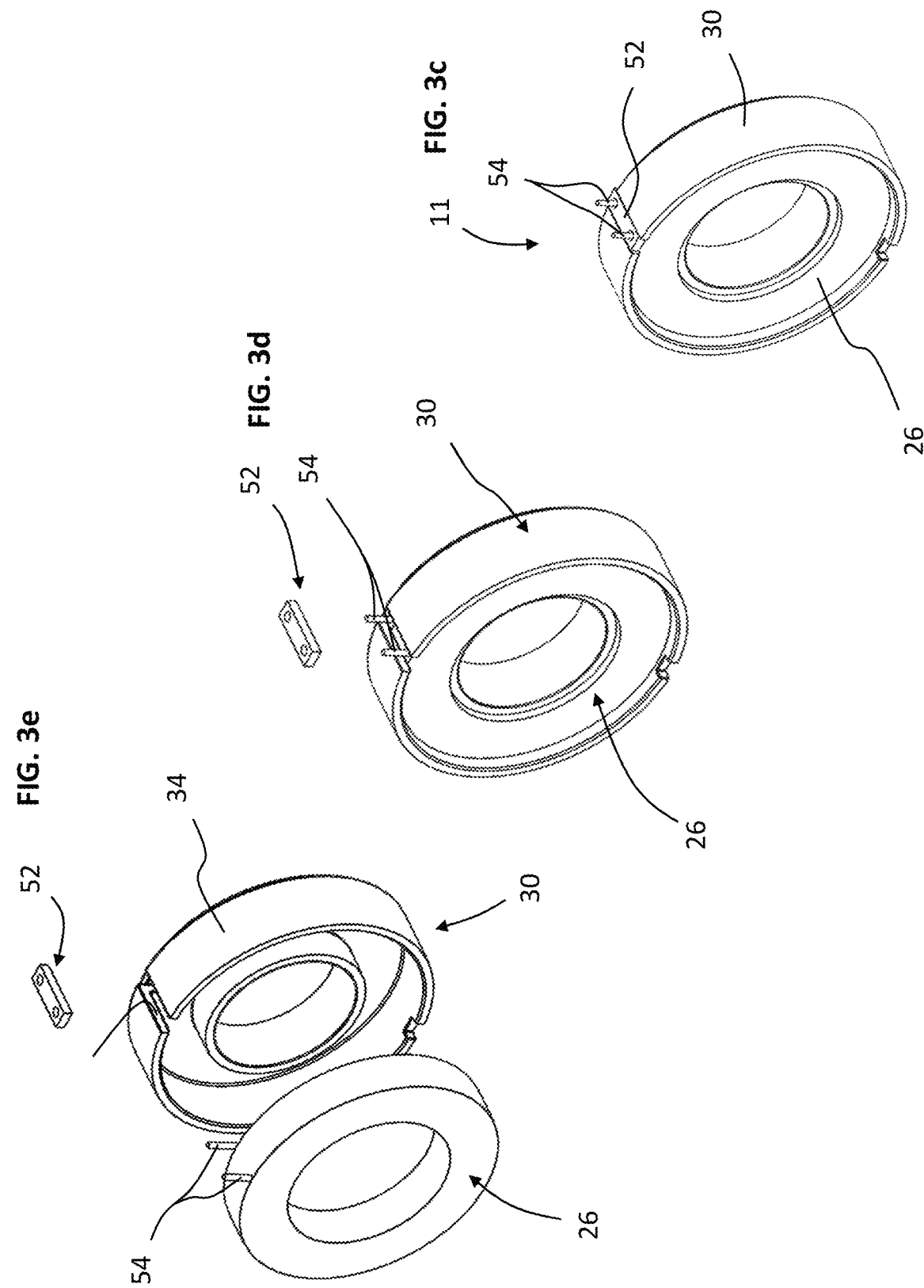

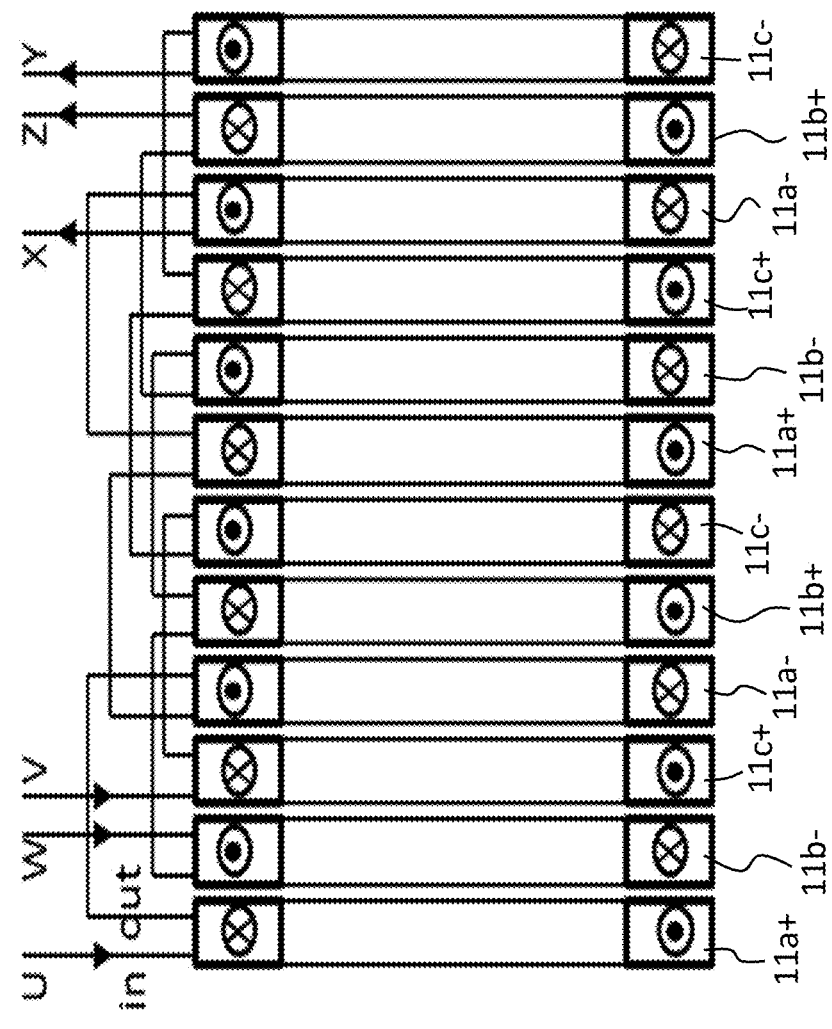

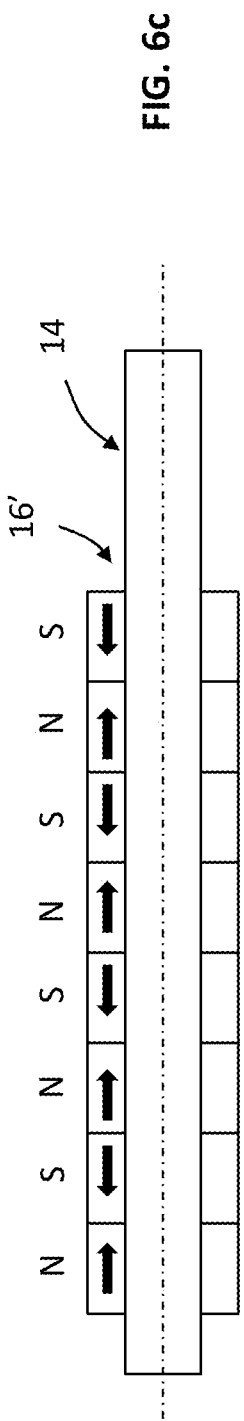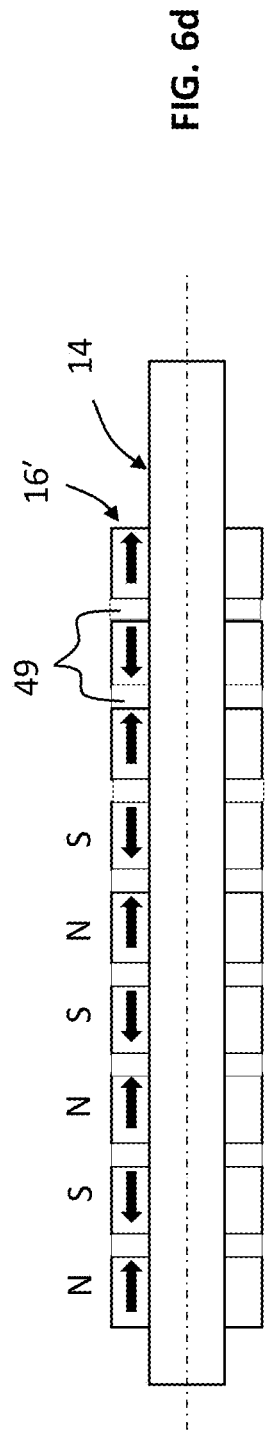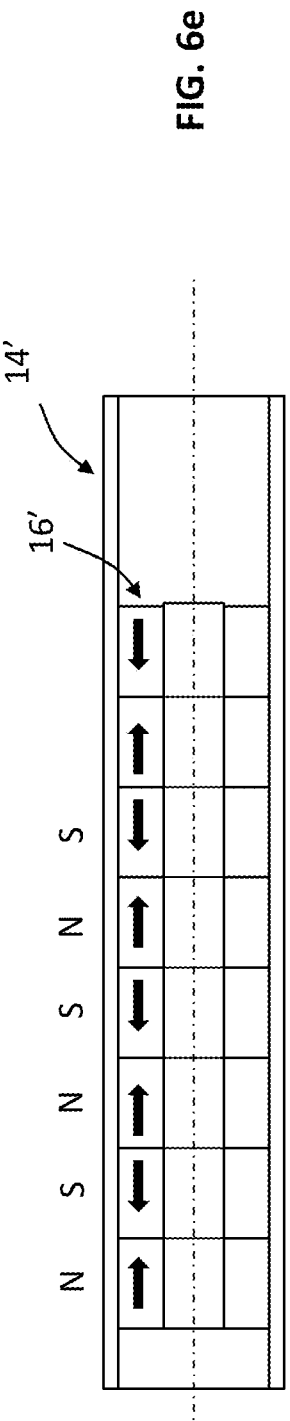

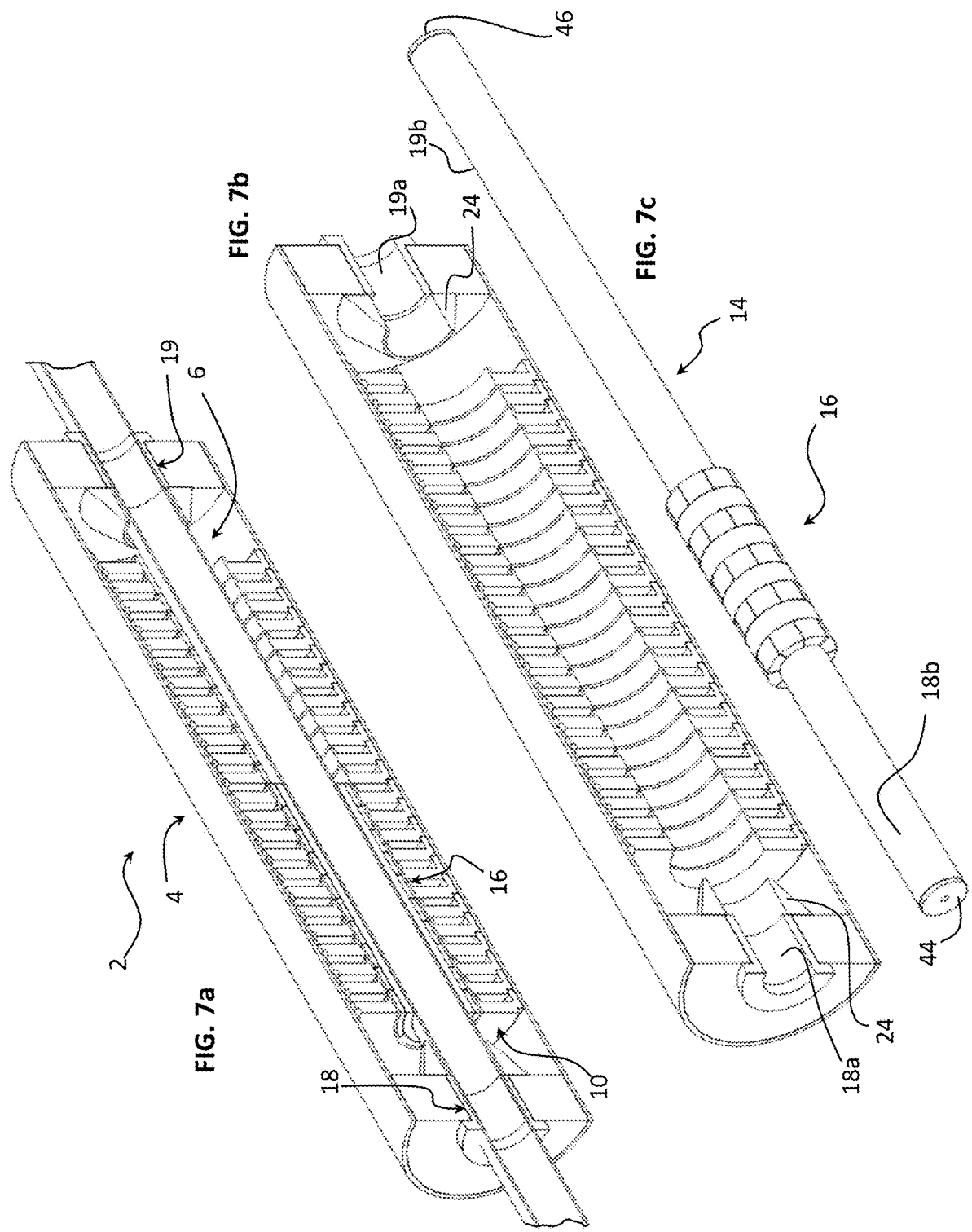

LINEAR MOTOR WITH STACKED ELECTROMAGNETS

RELATED APPLICATION INFORMATION

This patent claims priority from International PCT Patent Application No. PCT/EP2019/053201, filed Feb. 8, 2019 entitled, "LINEAR MOTOR", which claims priority to European Patent Application No. EP18156184.6, filed Feb. 9, 2018 all of which are incorporated herein by reference in their entirety.

The present invention relates to an electrical linear motor.

Linear electrical motors are disclosed in US 2015022030, US 2012098356 and EP 2541744. Conventional linear motors comprise a solid shaft having a plurality of magnetic segments of alternating polarity stacked in a direction corresponding to the linear movement of the shaft. In these conventional linear motors, the stator comprises a plurality of coils wound on a tubular support, coil portions being arranged in a juxtaposed manner and connected to phases of the electrical motor. At least one end of the shaft extends out of the stator and is intended to be coupled to an organ to be actuated. One of the advantages of such permanent magnet linear electrical motors is their compactness, high dynamic capability, in particular the ability to accelerate and decelerate very fast, few components and minimal wear of components, thus leading to high reliability. Conventional linear motors have however a low power to weight ratio, which is disadvantageous in certain applications, such as in the actuation of aircraft components, or for mounting on dynamic components such as industrial robot arms and other moving parts. There is also a continuous desire to improve the power to weight ratio and power to size ratios of motors in general, including linear motors.

Certain linear electrical motors, as disclosed in EP2224581 and U.S. Pat. No. 6,603,224, have stators made of stacked stator discs of ferromagnetic material and coils mounted between the stator discs. Manufacturing of such stators is however difficult, particularly in view of the difficulty of assembling the stator coil between the stator discs. Also, the electrical connection of the coils of the stator to a drive is complex and difficult to accomplish in an efficient and compact manner.

In view of the foregoing, it is an object of this invention to provide an electrical linear motor that is reliable and has a high power to weight ratio, yet that is economical to produce and use.

It is advantageous to provide an electrical linear motor that is reliable and has a high power to size ratio, yet that is economical to produce and use.

It is advantageous to provide a linear motor that is accurate and easy to control.

It is advantageous to provide a linear motor that has a long actuation travel.

Objects of this invention have been achieved by providing a linear motor according to descriptions herein.

Disclosed herein is an electrical linear motor comprising a stator and an actuation shaft movable in a linear axial direction (A) with respect to the stator. The stator comprises a casing and an electromagnet array mounted in the casing, the electromagnet array comprising a central orifice extending in the linear axial direction (A) within which the actuation shaft extends. The actuation shaft comprises a permanent magnet arrangement comprising a plurality of magnetic pole segments. The stator electromagnetic array comprises a plurality of electromagnets to generate a magnetic field that in conjunction with the magnetic field of the permanent magnet arrangement generates an electromotive force between the stator and actuation shaft having a component in the axial direction (A) to drive the actuation shaft relative to the stator.

According to a first aspect of the invention, the actuation shaft comprises a hollow tube and the permanent magnet arrangement has a tubular shape fixedly mounted around the tube.

According to a second aspect of the invention, the electromagnet array comprises a plurality of substantially disc shaped electromagnets stacked in said axial direction (A), each electromagnet comprising a coil support and at least one coil mounted within an axial recess of the coil support.

In an advantageous embodiment, the permanent magnet arrangement comprises a plurality of magnetic pole segments forming a Halbach magnet array.

In another embodiment, the permanent magnet arrangement comprises an array of alternating magnetic pole segments mounted on a magnetic core tube of magnetic material mounted on or forming as section of the hollow tube of the actuation shaft.

In an alternative embodiment, the actuation shaft comprises a hollow tube and the permanent magnet arrangement has a tubular shape fixedly mounted inside the tube.

In an embodiment, the permanent magnet arrangement comprises a plurality of alternating magnetic pole segments separated from each other by ferromagnetic spacer rings.

In an advantageous embodiment, the electromagnet array comprises a plurality of substantially disc shaped electromagnets stacked in said axial direction (A), each electromagnet comprising a coil support and at least one coil mounted within an axial recess of the coil support.

In an embodiment, a dielectric material covers the coil within the axial recess, in the form of a dielectric potting material, a dielectric resin, or an injected or molded dielectric polymer.

In an advantageous embodiment, the coil support is made of a magnetic material, such as a ferromagnetic material.

In an advantageous embodiment, the coil support comprises interengaging protuberance and recess on opposed axial sides of the coil support arranged for centering and aligning the stacked juxtaposed electromagnets along the linear axial direction (A).

In an advantageous embodiment, an inner annular rim of the coil support has an axial length in the axial direction (A) which is shorter than the axial length of an outer annular rim of the coil support to provide an axial gap of air or filled with a non-magnetic material in order to avoid a magnetic short-circuit in the stator through the inner annular rim.

In an advantageous embodiment, the hollow tube of the actuation shaft is made of a non-magnetic material, for instance a fibre reinforced resin material, a titanium alloy, an aluminium alloy, a carbon fibre reinforced material, or a plurality of layers of any combination of the aforementioned materials.

In an advantageous embodiment, a first end of the actuation shaft extends out of the stator and is arranged for coupling to an external component and a second end of the actuation shaft is positioned within the stator.

In an advantageous embodiment, the first end of the stator casing comprises a bearing surface slidably engaging the hollow tube of the actuation shaft.

In an advantageous embodiment, the actuation shaft comprises with a bearing at said second end engaging a bearing surface of the stator central orifice.

In an advantageous embodiment, said bearing surface of the stator central orifice is provided by a layer or coating of hardened or low friction material covering a central orifice of the electromagnet array.

In another embodiment, a first end of the actuation shaft extends out of the stator and is arranged for coupling to an external component and a second end of the actuation shaft extends outside of the stator casing, the stator casing comprises end caps with bearing surfaces slidably engaging the tube of the actuation shaft at opposed axial ends of the casing.

In an advantageous embodiment, the stator end caps comprise damper elements engageable with the actuation at end of travel positions.

In an advantageous embodiment, an axial end of the stator comprises a magnetic locking system to magnetically hold the actuation shaft when it reaches an end of travel position. In an embodiment, the axial end of the stator comprises a ferromagnetic material magnetically coupled to a permanent magnet on the actuation shaft, forming said magnetic locking system.

Further objects and advantageous features of the invention will be apparent from the following detailed description of embodiments of the invention in relation to the annexed drawings in which:

FIG. 1b is a perspective cross-sectional view of a stator of the embodiment of FIG. 1a;

FIG. 1c is a perspective view of an actuation shaft of the embodiment of FIG. 1a;

FIG. 1d is a view similar to FIG. 1c of a variant of the actuation shaft;

FIG. 2 is a perspective view of a stator of the linear motor of FIG. 1a (with the coil wiring removed);

FIG. 2a is perspective view of an electromagnet of the stator of FIG. 2;

FIG. 2b is a perspective view of a coil support of the electromagnet of FIG. 2a;

FIG. 3c is a perspective view of an electromagnet of the stator of FIG. 3a;

FIGS. 3d and 3e are exploded perspective views of the electromagnet of FIG. 3c;

FIG. 4b is a top view of part of the assembly tool mounting the coil wiring connector to the stator of FIG. 3a;

FIG. 5 is a schematic cross-sectional view of a stator winding of an electrical linear motor according to an embodiment of the invention, showing an example of a wiring interconnection of electromagnets of the stator;

FIGS. 6a-6e are schematic cross-sectional views of an actuation shaft of an electrical linear motor, showing magnetic poles of a permanent magnet array, according to various embodiments of the invention;

FIG. 7a is a perspective cross-sectional view of a linear motor according to another embodiment of the invention;

FIG. 7b is a cross-sectional view of a stator of the linear motor of FIG. 7a; and FIG. 7c is a perspective view of an actuation shaft of the linear motor of FIG. 7a;

Figure 1A:
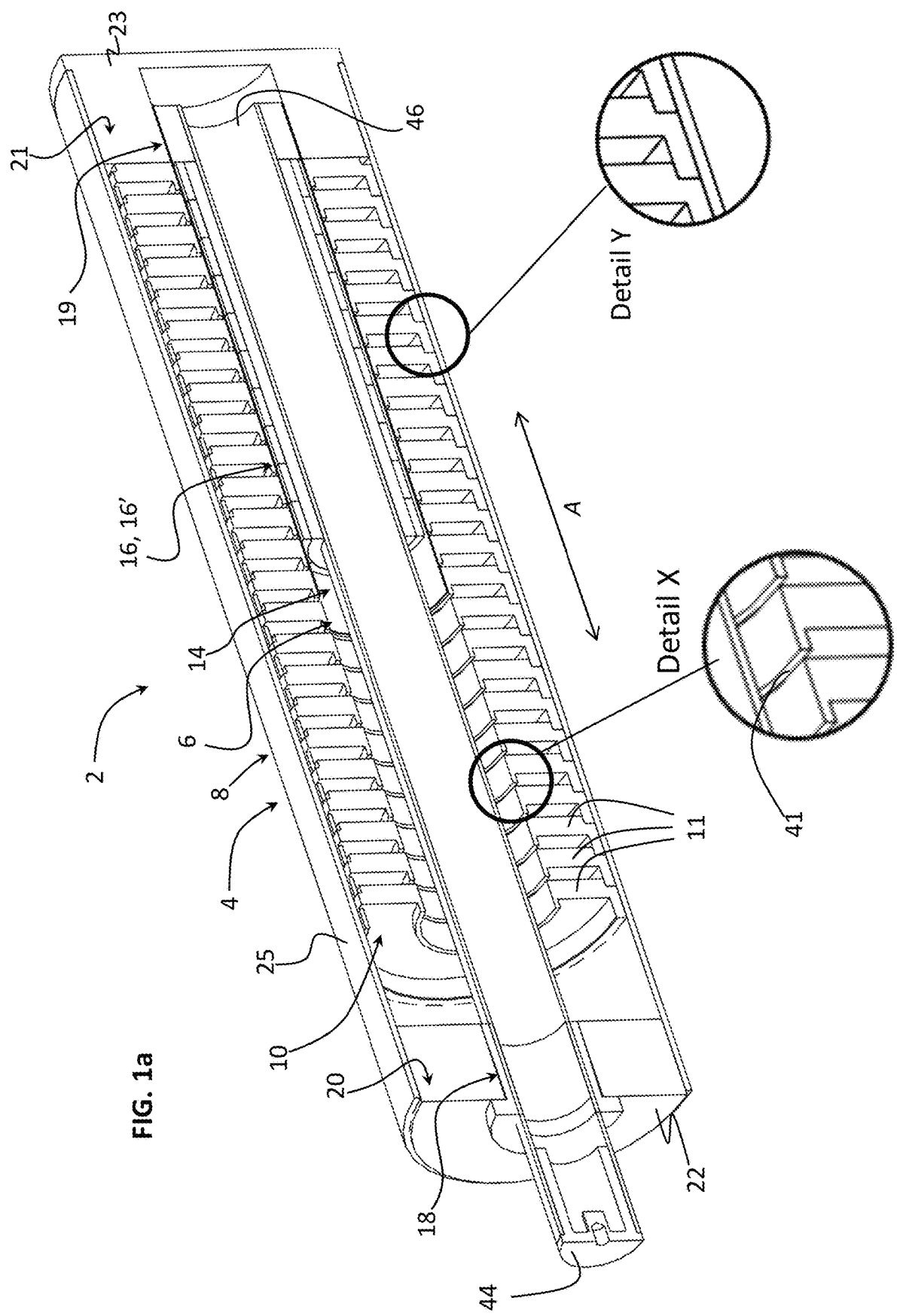
FIG. 1a is a perspective cross-sectional view of a linear motor according to an embodiment of the invention.
Figure 3A:
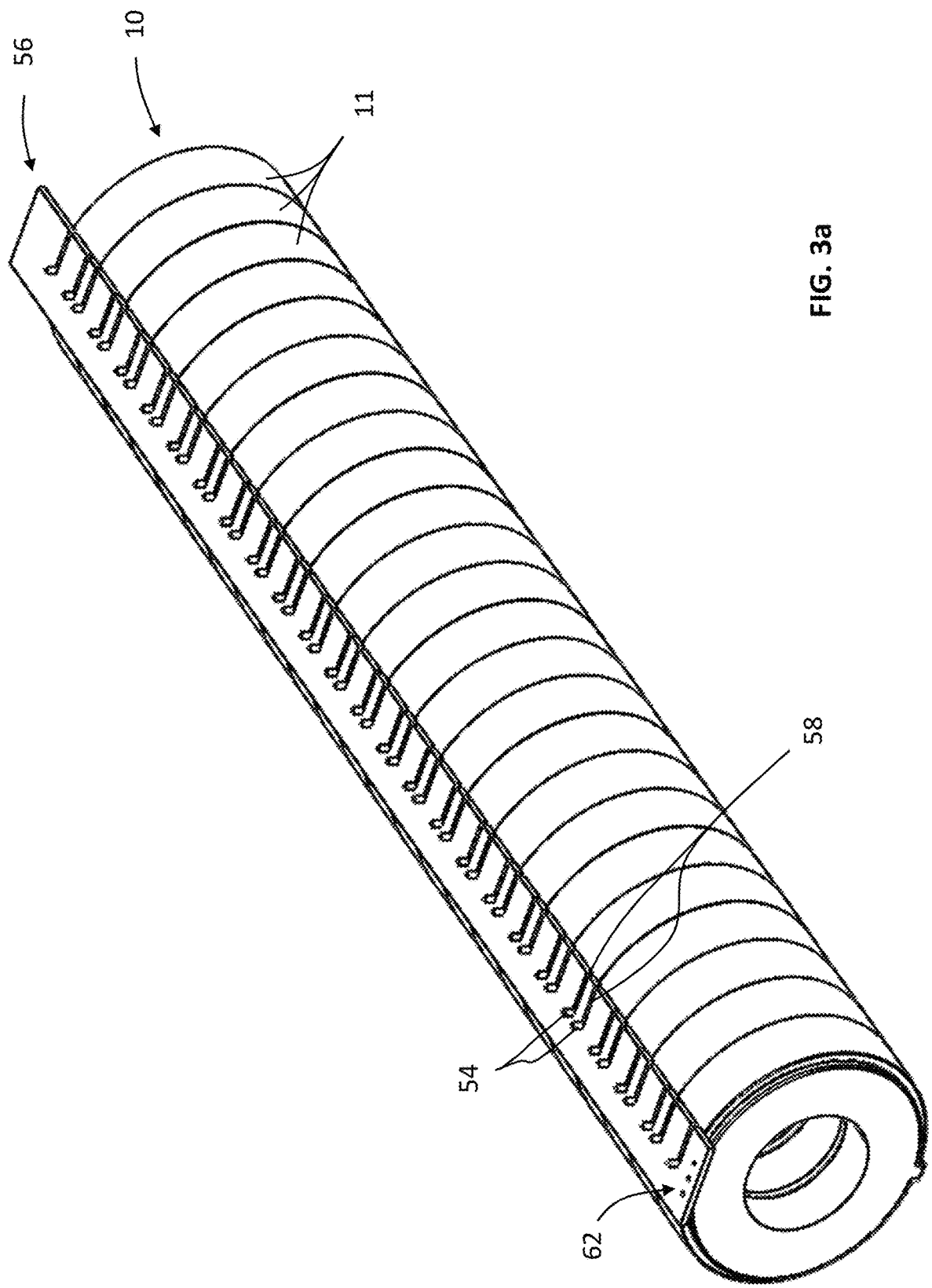
FIG. 3a is a perspective view of a stator with a coil wiring connector of a linear motor according to an embodiment of the invention.
Figure 3B:
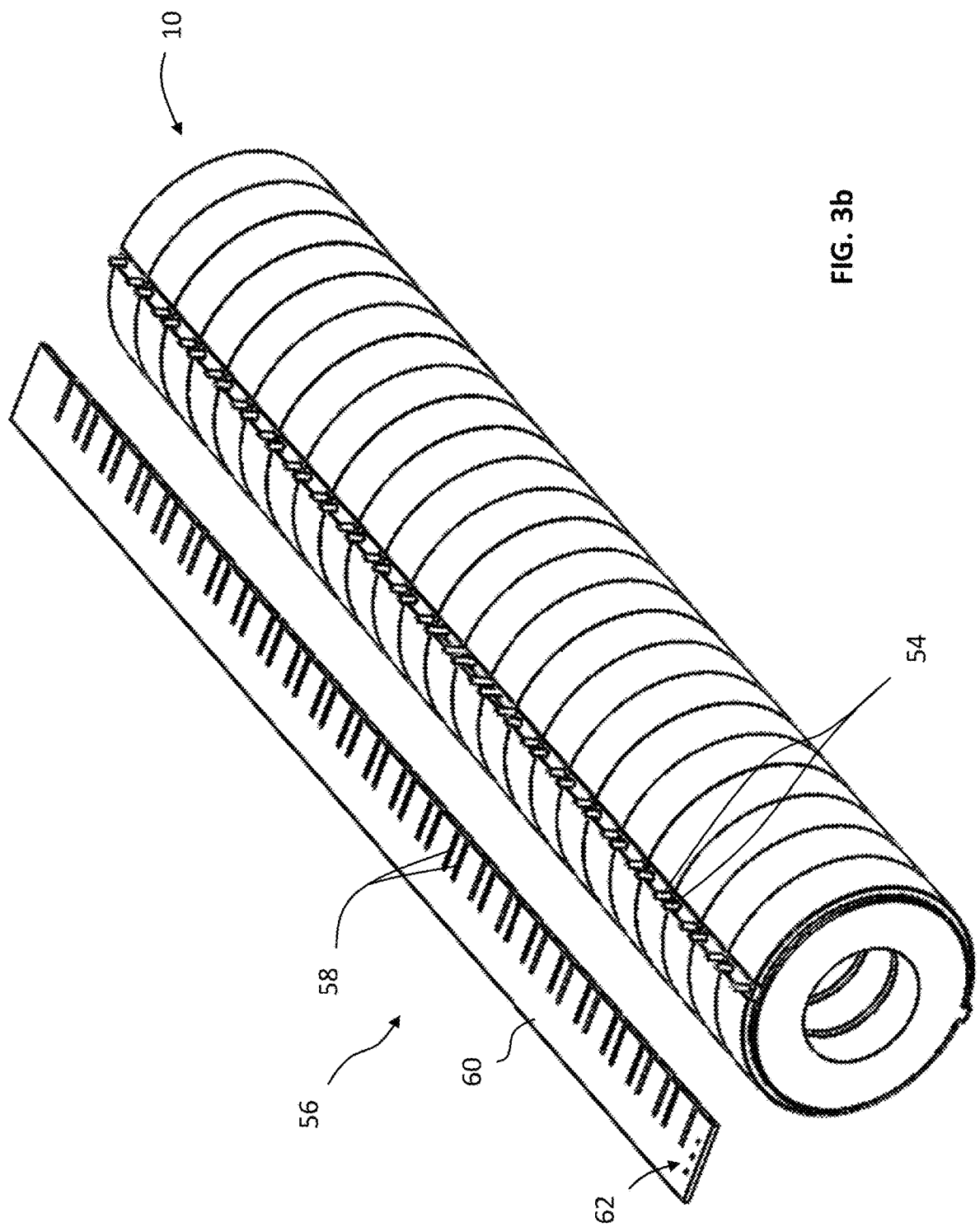
FIG. 3b is perspective view of the stator of FIG. 3a with the coil wiring connector unmounted.

Referring to the figures, an electrical linear motor 2 comprises a stator 4 and an actuation shaft 6 driven by the stator 4 in an axial direction A relative to the stator.

The stator 6 comprises an electromagnet array 10. The electromagnet array comprises a plurality of disk-ring shaped electromagnets 11 stacked in an axial direction A, and comprising a central orifice within which the actuation shaft 6 is axially movably received. The electromagnet array 10 is mounted within the tubular housing portion 25 of the casing 8. A surface of the orifice has a diameter D1 that is slightly greater than the outer diameter D2 of the permanent magnet arrangement 16, 16' on the actuation shaft 6. The difference in diameter D1-D2 is preferably in a range of 0.1 to 1 mm, depending on the diameter D1 to allow for manufacturing tolerances and different thermal radial expansions of the actuation shaft and stator to ensure that a gap is maintained under all specified operating conditions. In order to reduce the magnetic field gap between the stator electromagnet and the actuation shaft permanent magnet, the gap is however made as small as possible taking into account the above tolerances.

Each electromagnet 11 comprises a coil support 30 and a coil 26 mounted on the coil support. The coil is formed by a plurality of windings of a conducting wire 28. The coil is mounted in an axial recess 32 of the coil support. The coil support is substantially disc shaped, provided with the axial recess 32 that extends radially from a radially inner annular rim 40 to a radially outer annular rim 34 of the coil support 30. The radially inner annular rim 40 defines the central passage of the stator 4. The coil 26 mounted in the axial recess 32 may be covered by a dielectric potting or resin material or overmolded by a polymer. The coil support 30 may advantageously be made of a magnetic material, for instance a ferromagnetic material, to increase the magnetic flux density and coupling between the stator electromagnet and actuation shaft permanent magnets. In an advantageous embodiment, the coil support may be made of sintered magnetic powder in epoxy resin. This allows to reduce power losses in applications which require a high frequency as well as low weight.

In an embodiment, the inner annular rim 40 may have an axial length in the axial direction A which is shorter than the axial length of the outer annular rim 34, in order to provide an axial gap 41 in order to avoid a magnetic short-circuit as best seen in Detail X in FIG. 1.

The radially outer annular rim 34 may be provided with a wire outlet 36 and on an outer surface a recess 38 that may for instance extend in an axial direction A for receiving and guiding portions of the wire 28 interconnecting coils 26 of electromagnets 11 of the same electrical phase. The wire guide recess 38 may also serve to guide ends of the wires 28 forming coils 26 to connection terminals for electrical connection to a motor control and electrical power supply.

A plurality of electromagnets 11 may be stacked axially one against the other, as best illustrated in FIGS. 2, 1b, 7a, 7b and 5, to form a plurality of electromagnet segments 11a, 11b, 11c, forming alternating poles of the electromagnet. The linear motor may be a single phase, or multi-phase motor depending on the motor control unit and on the interconnections between coils 26 of the stator 4. In the example illustrated in FIG. 5, a three phase electromagnet arrangement is schematically illustrated represented by the phases U-X formed by interconnected electromagnets 11a, V-Y formed by interconnected electromagnets 11b, W-Z formed by interconnected electromagnets 11c. In this example, the motor comprises 12 electromagnets defining, three phases U-X, V-Y, W-Z with four poles (four electromagnets) per phase. The windings of electromagnets of a same phase may be wound in alternating opposite directions to form magnetic poles of alternating direction. For instance in the first phase the electromagnets 11a+ generate a magnetic pole of opposite direction to the magnetic pole generated by electromagnets 11a. The same applies to each of the two other phases.

As best seen in FIG. 2, the wire guide 38 formed on the radially outer annular rim 34 of each coil support 30 allows the interconnecting wires of a phase to pass from one coil of a phase to the subsequent coil of the same phase. The wire guide recess 38 may also be used for axial extending the connection ends of the wires axially out of one or both ends of the stator housing to a connector (not shown) or connection system for connection to a motor control unit and power supply (not shown).

In a variant as illustrated in FIGS. 3a-3e, wire connection ends 54 of the coil may also extend radially out of the coil support 30 of the casing. The coils may be interconnected within the stator casing, or extend out of the stator casing to interconnections means, for instance connection strip 60. The connection strip 60 may be in the form of a circuit board with conductive circuit traces thereon to simplify the interconnections between coils of the electromagnet or to the motor control unit and power supply. A connector (not shown) may be mounted on or integrally formed with the casing 8, for instance for pluggable connection to a complementary connector connected to the motor control unit and power supply. The connector may be directly mounted on the connection strip and connected to the conductive circuit traces on the connection strip interconnected to the wire connection ends 54.

Figure 4A:
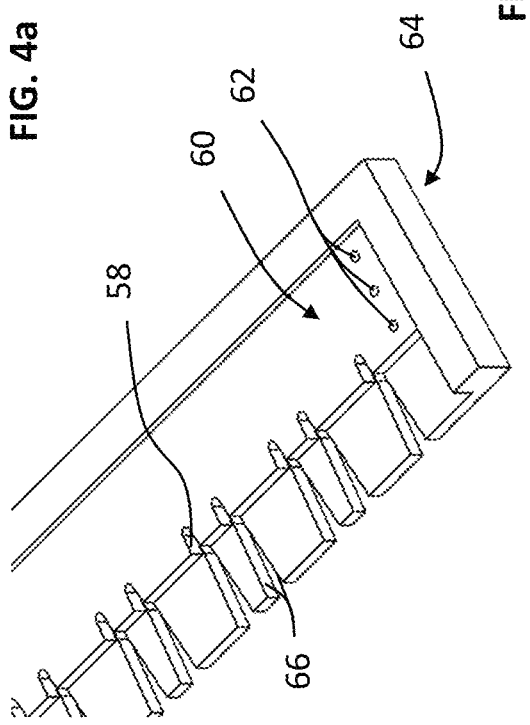
FIG. 4a is a perspective view of part of a coil wiring connector received in an assembly tool.
Figure 4C:
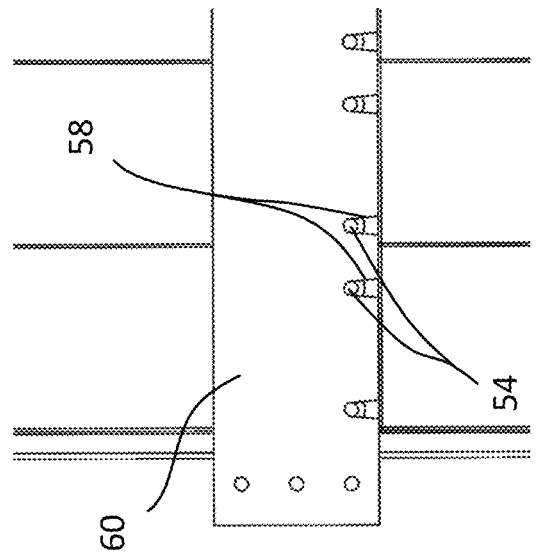
FIG. 4c is a view similar to FIG. 4b with the assembly tool removed.
Figure 4B:
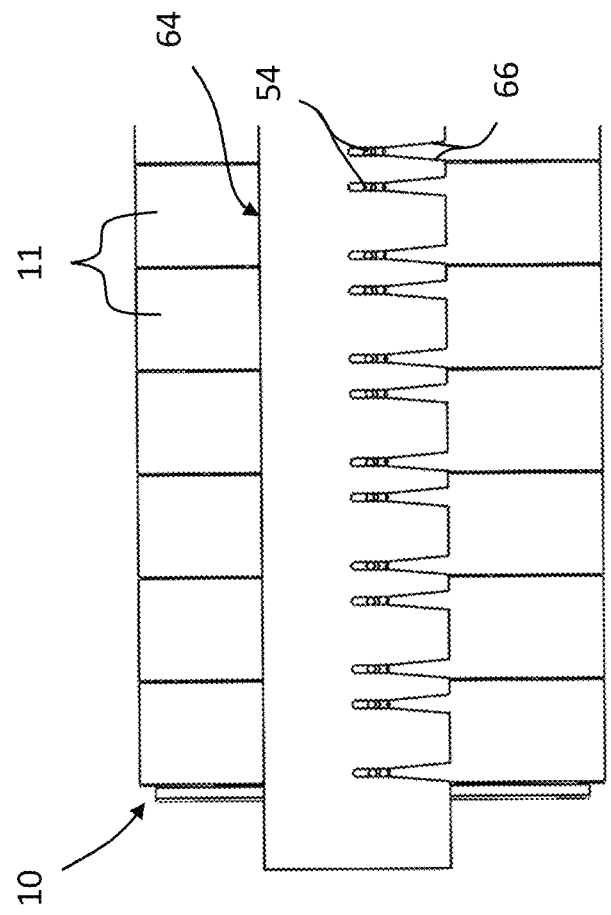

The wire connection ends 54 of each electromagnet 11 may be positioned and supported by an insulating connection end support 52, that may be mounted in the opening formed by the wire outlet on the radially outer rim 34 of the coil support 30. The connection end support 52, which may for instance be a plastic insert with orifices for passage of the wire ends therethrough, serves to accurately hold and position the wire connection ends 54 to facilitate assembly and connection to the connection strip 60. In this regard, the connection strip may be provided with wire end contacts 58 in the form of contact slots into which the wire connection ends 54 are inserted. This may advantageously be performed using a wire end assembly tool 64 as illustrated in FIGS. 4a-4c. The wire end assembly tool 64 comprises positioning elements, such as a recess, to position the connection strip 60 in the tool, and funnel shaped wire guide slots 66 that are aligned with the contact slots 58 of the connection strip. The tool with the connection strip may be positioned over the electromagnet array 10 and moved in direction tangential to the outer cylindrical surface of the electromagnet array with the wire connection ends 54 aligned with the wire guide slots 66 such that the wire connection ends are guided and inserted into corresponding contact slots 58.

In a variant (not shown), the connection strip may be provided with orifices rather than slots, and the assembly tool provided with funnel shaped orifices to guide the wire ends into the orifices as the tool is moved in a radial direction (i.e. a direction parallel to the wire connection ends 54).

Figure 8:
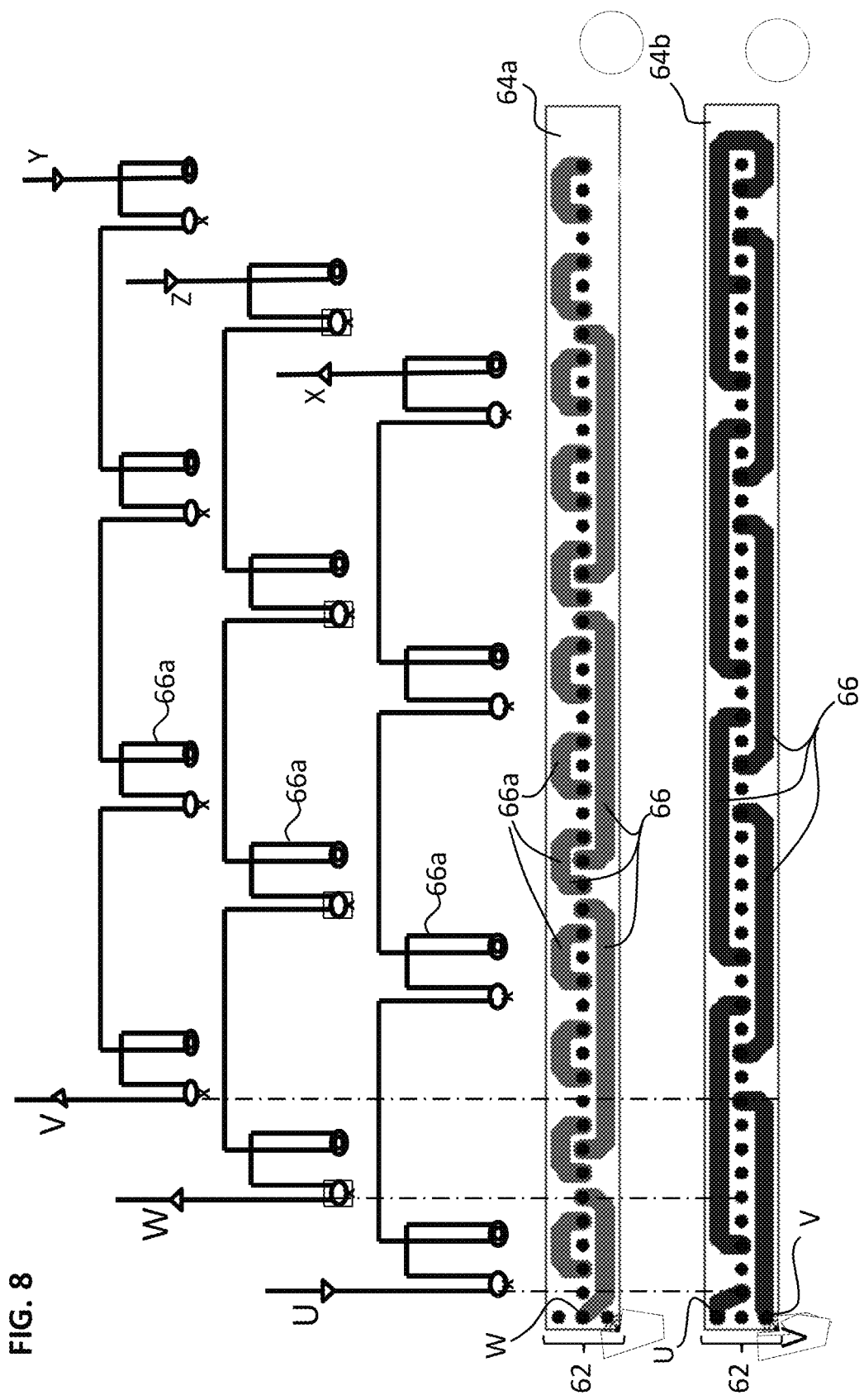
FIG. 8 is an illustration showing an example of circuit traces on a coil wiring connector to provide the wiring interconnection of electromagnets of the stator with phases U, V, W according to an embodiment of the invention.

The wire connection ends 54 may be electrically connected to conductive circuit traces on the connection strip 60, for instance having conductive layers around the contact slots or orifices, by soldering or welding. As illustrated in FIG. 8, the conductive circuit traces 66 may be provided on two layers 64a, 64b of the connection strip, or in three or more layers (not shown), to provide the interconnections between electromagnets forming the multiple (in this example three) phases U-X, V-Y, W-Z. The bridging circuit traces 66a interconnect the coils of adjacent electromagnets.

Each electromagnet 11 may comprise a single wire winding, or in a variant comprise two or more wire windings. In a preferred embodiment, each electromagnet comprises a single wire winding.

The coil support 30 or a dielectric overmolding thereof may advantageously comprise interengaging centering elements 24, 39 to align and centre the axially stacked juxtaposed electromagnets 11. For instance, in the illustrated embodiments, the coil support 30 comprises an annular recess 39 on one side that is engaged by the radially outer rim 34 of the adjacent electromagnet. Centering elements may alternatively or in addition be provided on the radially inner annular rim.

The electromagnets 11 of the electromagnet array 10 may be bonded together by various bonding technics such as welding, adhesive bonding, clamping together mechanically by casing parts (for instance between the end caps 20, 21), or overmolded with a polymeric material.

The provision of the substantially disc shaped coil supports with coils mounted therein allows the stator electromagnet to be manufactured in a cost effective manner while further ensuring a dense packing of electromagnets in the axial direction A for a high power to size ratio. Also, the electromagnet array 10 may conveniently be made at a greater or shorter axial length by changing the number of electromagnets in an economical manner, each electromagnet being manufactured essentially identically.

While the casing 8 of the stator according to the illustrated embodiments is provided with a circular tubular outer casing, the skilled person will appreciate that various casing forms and shapes may be provided depending on the application and the mounting of the stator to an external component.

The actuation shaft 6 extends between a first end 44 and a second end 46. At least one of the ends (in the embodiment illustrated the first end 44) is an actuation end configured for coupling to a first external component (not shown) that is movable relative to a second external component (not shown) to which the stator 4 is fixed. The actuation end 44 may be provided with a coupling device or fixing elements for coupling or fixing the shaft to the first external component. Similarly, the stator 4 may be provided with a coupling device or fixing elements for coupling or fixing the stator to the second external component. Since the actuation shaft 6 moves relative to the stator 4, either the first or the second or even both first and second external components may be actuated relative to a fixed referential, depending on the application.

In the embodiment illustrated in FIGS. 1a to 1d, the second end 46 of the shaft is mounted inside the stator and does not actuate an external component.

In a variant, as illustrated in FIGS. 7a to 7c, both the first and second ends of the actuation shaft may be positioned outside of the stator and either one of the ends, or both of the ends, may be coupled to external actuated components. In the embodiment of FIGS. 7a to 7c, the actuation shaft 6 having ends extending beyond opposed ends of the stator 4 may serve the purpose of providing two actuation ends on the actuation shaft and are simply for improving the stability of linear guidance of the shaft relative to the stator. In the latter case, the implementation of the motor in a mechanism must allow for the extension of the second actuation end and the displacement thereof which requires more space with respect to the first embodiment illustrated in FIGS. 1a to 1d.

The stator comprises a casing 8 extending between axial ends 22, 23, including in the illustrated embodiment, a generally tubular housing portion 25 and end portions 20, 21, for instance in the form of first and second end caps 20, 21 mounted at said axial ends 22, 23 of the casing 8.

In the embodiment of FIGS. 1a to 1c, one of the end caps 21 may be closed, preferably in a dust-proof or hermetic manner. At least one end cap 20 is provided with a passage allowing the actuation shaft 6 to slidably extend therethrough. End caps 20 and 21 may advantageously comprise multi-leaf seals including a scraper function to swipe dirt off the shaft to avoid dirt from entering inside the motor.

In the embodiment illustrated in FIGS. 7a to 7c, the actuation shaft extends through both ends of the stator 4, and both first and second end caps 20, 21 are provided with respective passages allowing the actuation shaft 6 to slidably extend therethrough.

The actuation shaft 6 is slidably supported and guided relative to the stator by a first bearing 18 (formed by bearing surfaces 18a, 18b) and a second bearing 19 (formed by bearing surfaces 19a, 19b, 19c, 19a', 19b').

A shaft bearing surface 18a may be formed in the passage through the end cap 20, arranged for sliding engagement on a bearing surface 18b of the actuation shaft, the bearing surfaces 18a, 18b forming the first bearing 18 for supporting the axial sliding movement of the actuation shaft 6.

In the embodiment of FIGS. 7a-7c, shaft bearing surfaces 18a, 19a may be formed in the passages through both end caps 20, 21 arranged for sliding engagement on respective bearing surfaces 18b, 19b of the actuation shaft, the bearing surfaces 18a, 18b and 19a, 19b forming the first and second bearings 18, 19 for supporting the axial sliding movement of the actuation shaft 6.

In embodiments, for instance as illustrated in FIGS. 1a-1d, where one end of the actuation shaft remains within the stator casing 8, the actuation shaft may be provided with a bearing element 19b' adjacent the shaft second end 46 that slidably engages an inner bearing surface 19a' within the stator.

The bearing surfaces 18b, 19b, 19b' on the shaft and 18a, 19a, 19a' on the stator may advantageously be in the form of sliding bearing surfaces, both the stator and shaft being provided with low friction materials or coatings at the bearing surface, for instance TEFLON (PTFE), low friction plastic, Aluminium-Bronze, ToughMet® Spinodal (C96900) or any metallic or non-metallic materials with Everlube® coatings (MoS2, PTFE, Graphite, Epoxy), HVOF coatings, thermal spray coatings or Zinc-Nickel coating.

The actuation shaft bearing surface 19c may also be provided with a ball bearing assembly as illustrated schematically in FIG. 1d, for rolling contact against the stator bearing surface 19a'.

The actuation shaft 6 comprises a hollow tube 14, 14' and a permanent magnet arrangement 16 mounted on or in the tube 14.

Figure 6A:
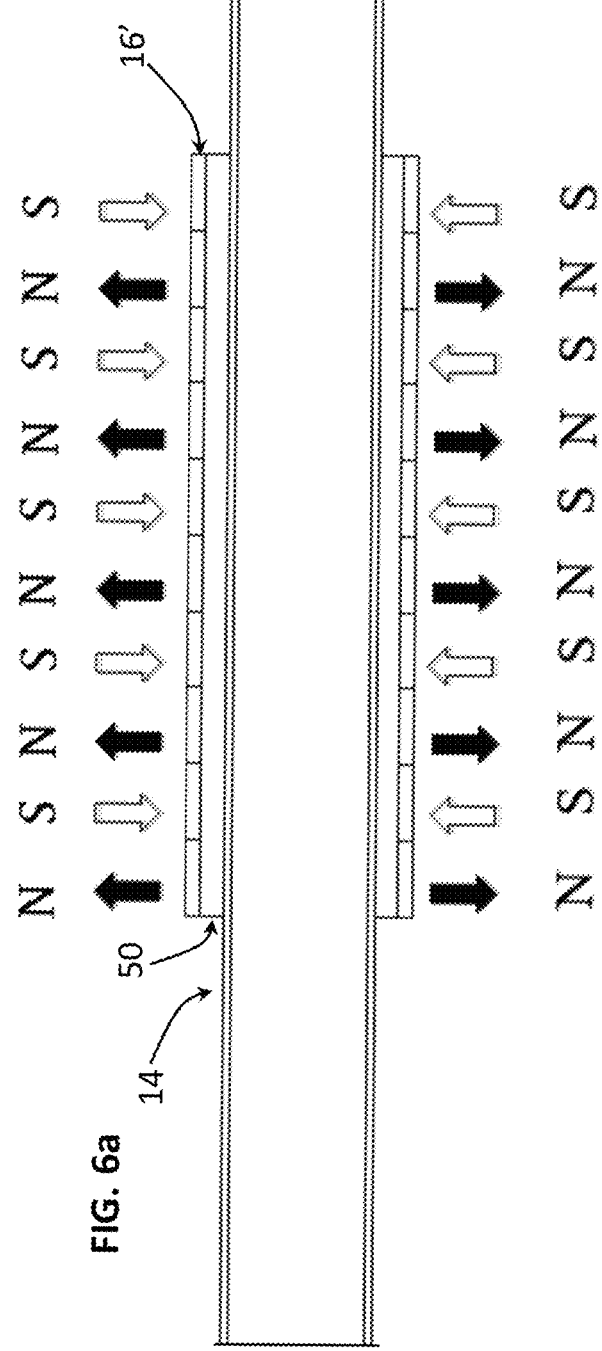
Figure 6B:
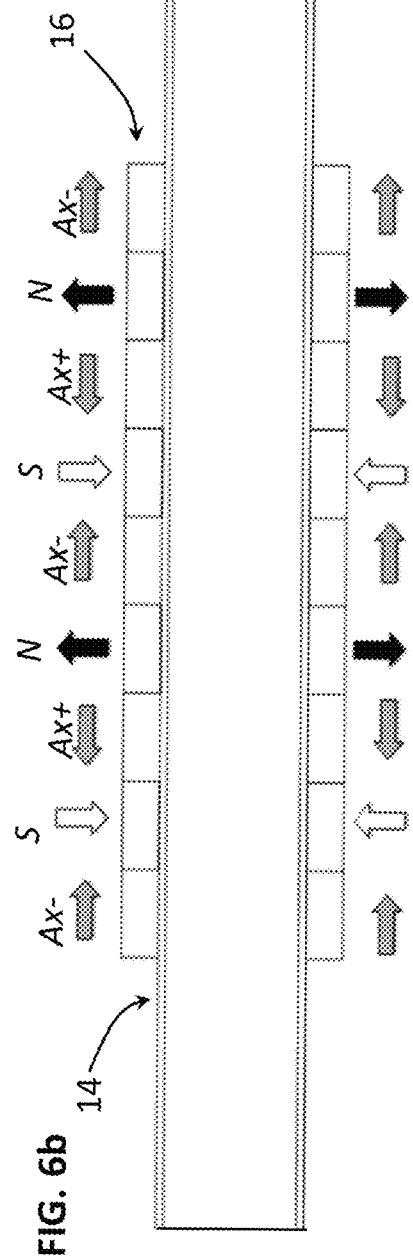

The permanent magnet arrangement 16, 16' preferably has a tubular shape and surrounds the tube 14 of the actuation shaft, for instance as illustrated in FIGS. 6a, 6b. In an alternative embodiment as illustrated in FIG. 6e, the permanent magnet arrangement 16 preferably has a tubular shape and is surrounded by the tube 14 of the actuation shaft. The tube 14 in this embodiment is made of a non-ferromagnetic material. Each permanent magnet may thus be ring shaped, whereby in an advantageous embodiment the ring shape may be built up of segments, for instance eight curved segments, which are bonded on the tube 14 of the actuation shaft.

The permanent magnet arrangement 16, 16' comprises a plurality of juxtaposed magnetic pole segments of successively changing polarities.

In an embodiment, the permanent magnet arrangement 16 comprises a Halbach array as best illustrated in FIG. 6b, whereby alternating magnetic pole segments N, S are separated by axially aligned magnetic pole segments Ax−, Ax+ that are also of alternating magnetic polarity.

In a variant as schematically illustrated in FIG. 6d, the alternating magnetic pole segments N, S are separated by ferromagnetic spacer rings 49. This configuration advantageously reduces ripple noise in the driving of the electromagnet array and enables smoother control of linear movement of the actuation shaft.

In variants, for instance as illustrated in FIGS. 6a and 6c, the magnetic the alternating magnetic pole segments N, S may be arranged directly one next to the other without spacers or axially aligned magnets.

The permanent magnet arrangement 16 with the Halbach array as illustrated in FIG. 6b, may be mounted on a tube 14 of the actuation shaft that is in a non-ferromagnetic material. The tubular Halbach magnet array 16 may be mounted directly on the tube 14 and fixed thereto by bonding with an adhesive, inmolding, welding, fixing by mechanical means and other per se known connection techniques between coaxial tubular components.

The tube 14 may for instance comprise or consist of a fibre reinforced tube, for instance a carbon fibre reinforced resin tube. Other non-magnetic materials may also be used for the tube, for instance aluminium or titanium based alloys for high strength to weight ratios. Other polymeric, metallic, ceramic and multilayer combinations thereof may be provided for the structure of the hollow tube 14.

In another embodiment as best illustrated in FIG. 6a, the permanent magnet arrangement 16' may comprise juxtaposed alternating magnetic pole segments N, S, the permanent magnet arrangement 16' also in the form of a tube with ring-shaped alternating magnetic pole segments N, S. The permanent magnet arrangement 16' may be mounted on a tubular magnetic core 50 made of a magnetic material, such as a ferromagnetic material. The tubular magnetic core 50 may form a layer between the tube 14 and the magnet arrangement 16', the magnetic core tube 50 being mounted directly on the tube 14. The coaxially arranged magnet arrangement 16', tubular magnetic core 50, and tube 14, may be fixed together by bonding with an adhesive, inmolding or overmolding (for instance with a thermoplastic polymer), welding, mechanical connection techniques and other per se known connection techniques between coaxial tubular components.

The magnetic core tube 50 strengthens the magnetic flux between alternating pole segments N, S and thus strengthens the magnetic field of the permanent magnet arrangement 16' with respect to the stator. In this embodiment, the tube 14 of the actuation shaft may also be made of a non-magnetic material as described above, the permanent magnet arrangement being fixed to the magnetic core tube 50 by bonding, welding, overmolding, and other per se known connection techniques.

In a variant, the tubular magnetic core 50 may form a section of the tube 14, whereby the tube 14 may be made of a magnetic material, or comprise a section of magnetic material connected to sections of non-magnetic material.

The tubular permanent magnet arrangement 16, 16' in the embodiments described above is particularly advantageous in that a particularly light weight and compact actuation shaft 6 may be provided, in particular comprising a hollow tube 14 that may be made in various light weight high strength materials, in combination with a strong magnetic field from the permanent magnet arrangement 16, 16' on which the actuation force of the linear electrical motor is dependent.

In variants, the tube 14 may also be made of a magnetic material without departing from the scope of the invention.

The actuation shaft 6 is illustrated in preferred embodiments with a cylindrical tube 14, however the tube in variants may have a non-cylindrical shape and the bearings provided with a complementary non-cylindrical shape, for instance serving to prevent rotation of the actuation shaft 6. Anti-rotation shapes may also be provided in the inner bearings 19a', 19b', 19c. The non-cylindrical shape of the actuation shaft may also serve to provide increased bending resistance in a specific direction depending on the application.

In variants, the permanent magnet arrangement 16 may also be provided with a non-cylindrical outer shape whereby the orifice of the stator surrounding the actuation shaft permanent magnet array, is provided with a complementary shape. In this case, the coils may comprise non-circular windings. For instance, the coils could have an elliptical, essentially square, or polygonal shaped winding and the orifice in the electromagnets provided with an essentially complementary shaped central orifice.

In an embodiment, one or both axial ends of the stator 4 may be provided with a magnetic locking system to magnetically hold the actuation shaft when it reaches the end of travel at the axial end provided with the magnetic locking system. In an embodiment, the magnetic locking system may be formed by a ferromagnetic material, or a permanent magnet on or forming part of the first and/or second end caps 20, 21 mounted at said axial ends 22, 23 of the casing 8 that magnetically couples to the permanent magnet on the actuation shaft. The magnetic locking system may also comprise an electromagnet. The electromagnet may serve to unlock the magnetic coupling by generating an opposite magnetic field to the magnetic field attracting the actuation shaft to the casing axial end.

Figure 9:
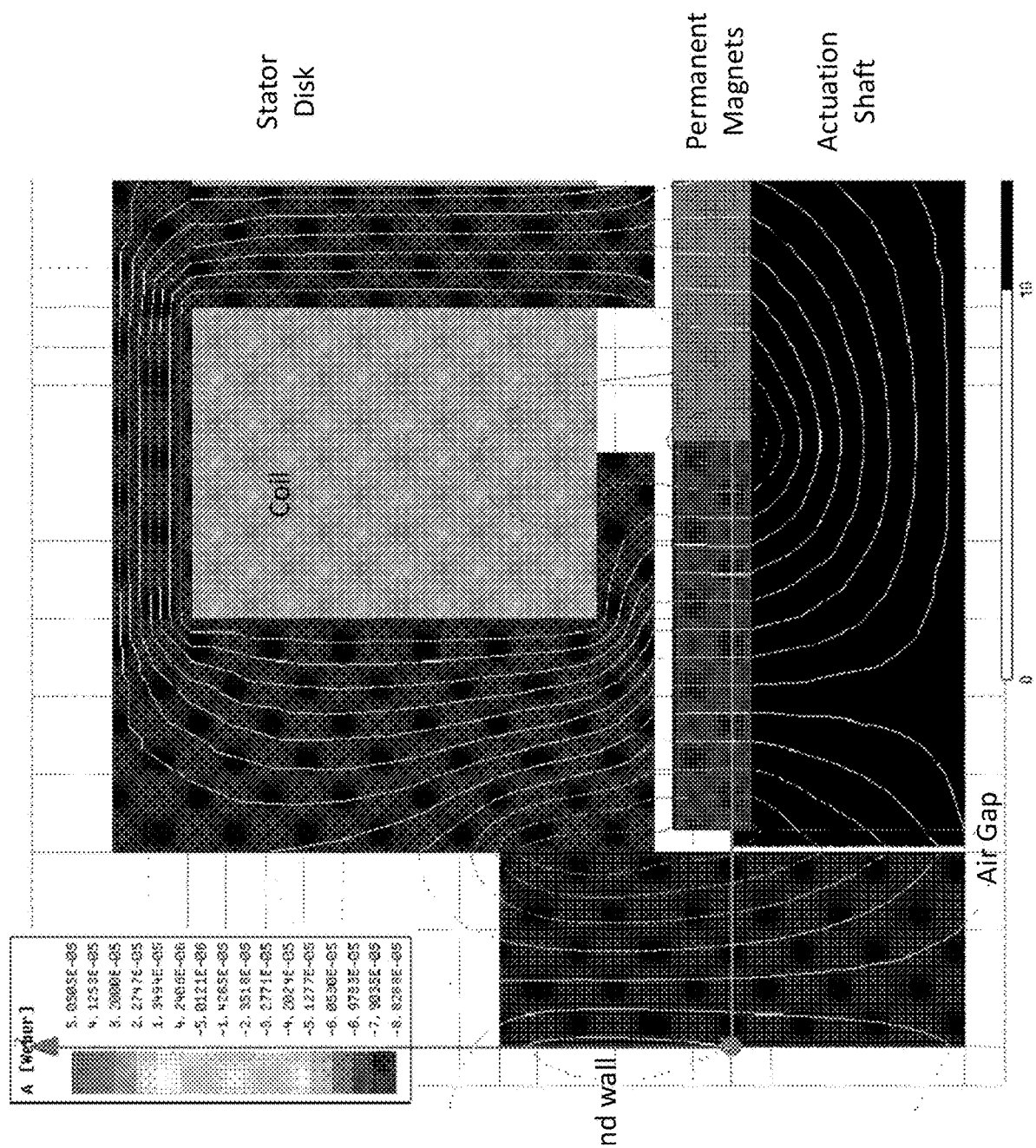
FIG. 9 illustrates a computer simulation of the magnetic flux at an axial end of the stator magnetically holding the actuation shaft.

FIG. 9 illustrates a computer simulation of the magnetic flux at an axial end of the stator provided with a ferromagnetic material magnetically coupled to the actuation shaft, forming a magnetic locking system according to an embodiment. The magnetic flux of the permanent magnet axially positioned at the axial extremity of the shaft recirculates through the stator disks at the end of the stator, which may be provided with a bigger wall thickness in the axial direction. The magnetic flux from the stator disk reaches an end wall of the stator and recirculates through an air gap separating an axial end of the shaft from an inner surface of the end wall to the magnets. In this way, an axial attraction force is generated.

The air gap may be kept constant thanks to a non-ferromagnetic spacer on the shaft or stator. By adjusting the air gap width, and the height (thickness) of the shaft area exposed to the end wall, it is possible to tune the magnetic attraction force.

List of references

Electrical linear motor 2
   Stator 4
      Casing 8
         First end 22
         Second end 23
         Tubular housing portion 25
         First end cap 20
            Bumper 24
         Second end cap 21
            Bumper 24
      Electromagnet array 10
         Electromagnet 11
            Coil 26
               Wire 28
                   Connection ends 54
            Coil support 30
               Axial recess 32
               Radially Outer annular rim 34
                  Annular recess 39
                  Wire outlet 36
                  Wire guide groove 38
               Radially Inner annular rim 40
            Connection end support 52
      Connector 56
         Connection board/strip 60
            Wire end contacts 58
               Contact slot / orifice
         External connector portion 62
         Connection layers 64a, 64b
            Circuit traces 66,
                  Electromagnet bridging circuit trace 66a
      Bearings 18a, 19a
   Actuation shaft 6
      Tube 14
         First end 44
            Actuation end
         Second end 46
            Bearing end
      (Tubular) permanent magnet arrangement 16, 16'
         Tubular Halbach magnet array 16
            Magnetic pole segments N, S, Ax−, Ax+
            Ferromagnetic spacer ring 49
         Tubular alternating magnet array 16'
            Magnetic pole segments N, S 48
         Magnetic core tube 50
      Bearings 18b, 19b
   Bearings 18,19
Phases: U-X, V-Y, W-Z
Wire end assembly tool 64
   Wire guide slots 66

The invention claimed is:

1. An electrical linear motor comprising a stator and an actuation shaft movable in a linear axial direction with respect to the stator, the stator comprising a casing, an electromagnet array mounted in the casing, the electromagnet array comprising a central orifice extending in the linear axial direction within which the actuation shaft extends, the actuation shaft comprising a permanent magnet arrangement comprising a plurality of magnetic pole segments, the electromagnet array comprising a plurality of electromagnets to generate a magnetic field that in conjunction with the magnetic field of the permanent magnet arrangement generates an electromotive force between the stator and actuation shaft having a component in the axial direction to drive the actuation shaft relative to the stator, characterized in that the plurality of electromagnets is a plurality of substantially disc shaped electromagnets, each electromagnet-comprising a coil support having an axial recess extending radially from a radially inner annular rim to a radially outer annular rim, the radially inner annular rim defining the central orifice of the stator, the axial recess arranged on one side of the coil support and at least one coil is fully inserted within said axial recess, a dielectric material covering the coil within the axial recess, in the form of a dielectric potting material, a dielectric resin, or an injected or molded dielectric polymer, said at least one coil being pre-assembled to the coil support to form a single electromagnet, a plurality of said single electromagnets being assembled in a stacked manner in said axial direction to form the electromagnet array.

2. The linear motor according to claim 1, wherein the actuation shaft comprises a hollow tube and the permanent magnet arrangement has a tubular shape fixedly mounted around the tube.

3. The linear motor according to claim 2, wherein the permanent magnet arrangement comprises an array of alternating magnetic pole segments mounted on a magnetic core tube of magnetic material mounted on or forming a section of the hollow tube of the actuation shaft.

4. The linear motor according to the claim 1, wherein the actuation shaft comprises a hollow tube and the permanent magnet arrangement has a tubular shape fixedly mounted inside the tube.

5. The linear motor according to claim 1, wherein the permanent magnet arrangement comprises a plurality of magnetic pole segments forming a Halbach magnet array.

6. The linear motor according to claim 1, wherein the permanent magnet arrangement comprises a plurality of alternating magnetic pole segments (N, S) arranged directly one next to the other.

7. The linear motor according to claim 1, wherein the permanent magnet arrangement comprises a plurality of alternating magnetic pole segments (N, S) separated from each other by ferromagnetic spacer rings.

8. The linear motor according to claim 1, wherein the coil support is made of a magnetic material, such as a ferromagnetic material.

9. The linear motor according to claim 1, wherein the coil support comprises interengaging protuberance and recess on opposed axial sides of the coil support arranged for centering and aligning the stacked juxtaposed electromagnets along the linear axial direction.

10. The linear motor according to claim 1, wherein the actuation shaft comprises a hollow tube and the permanent magnet arrangement has a tubular shape fixedly mounted around the tube; and wherein the hollow tube of the actuation shaft is made of a non-magnetic material, a fibre reinforced resin material, a titanium alloy, an aluminium alloy, a carbon fibre reinforced material, or a plurality of layers of any combination of the aforementioned materials.

11. The linear motor according to claim 1, wherein a first end of the actuation shaft extends out of the stator and is arranged for coupling to an external component and a second end of the actuation shaft is positioned within the stator.

12. The linear motor according to claim 1, wherein a first end of the stator casing comprises a bearing surface slidably engaging the hollow tube of the actuation shaft.

13. The linear motor according to claim 1, wherein a first end of the actuation shaft extends out of the stator and is arranged for coupling to an external component and a second end of the actuation shaft is positioned within the stator; and wherein the actuation shaft comprises a bearing at said second end engaging a bearing surface of the stator central orifice.

14. The linear motor according to claim 13, wherein said bearing surface is provided by a layer or coating of a bearing support material, a hardened material or a low friction material, covering a central orifice of the electromagnet array.

15. The linear motor according to claim 1, wherein a first end of the actuation shaft extends out of the stator and is arranged for coupling to an external component and a second end of the actuation shaft extends outside of the stator casing, the stator casing comprises end caps with bearing surfaces slidably engaging the tube of the actuation shaft at opposed axial ends of the casing.

16. The linear motor according to claim 15, wherein the stator end caps comprise damper elements engageable with the actuation shaft at end of travel positions.

17. The linear motor according to claim 1, wherein an axial end of the stator comprises a magnetic locking system to magnetically hold the actuation shaft when it reaches the end of travel at said axial end provided with the magnetic locking system.

18. The linear motor according to claim 17, wherein said axial end of the stator comprises a ferromagnetic material magnetically coupled to a permanent magnet on the actuation shaft, forming said magnetic locking system.

\* \* \* \* \*